Nov. 21, 1933.  W. H. BAUCH  1,936,344

SOUND PICTURE APPARATUS

Original Filed Aug. 18, 1930  2 Sheets-Sheet 1

INVENTOR.
WILLIAM H. BAUCH.

BY
Lockwood Lockwood Goldsmith & Galt
ATTORNEYS.

Nov. 21, 1933.  W. H. BAUCH  1,936,344
SOUND PICTURE APPARATUS
Original Filed Aug. 18, 1930   2 Sheets-Sheet 2
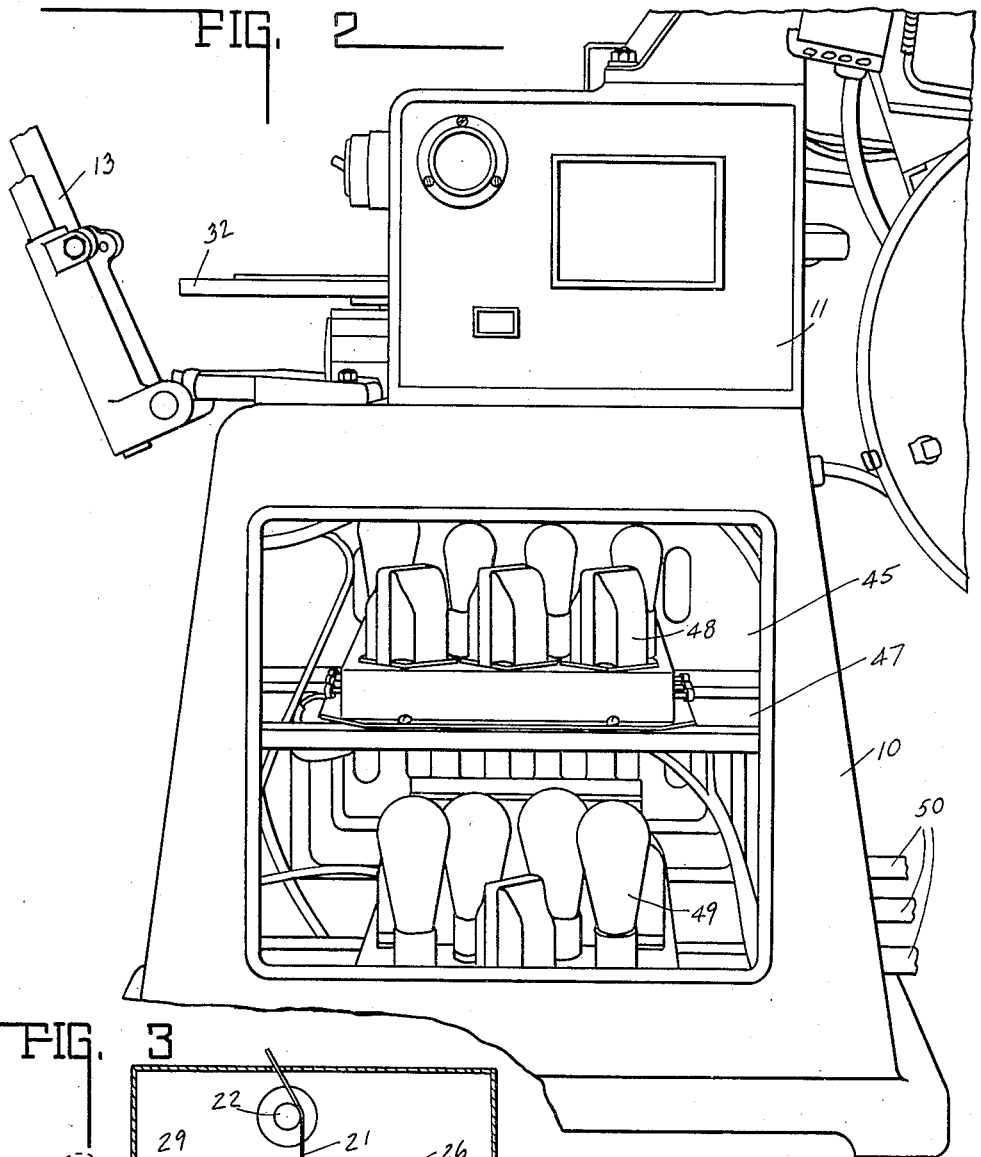
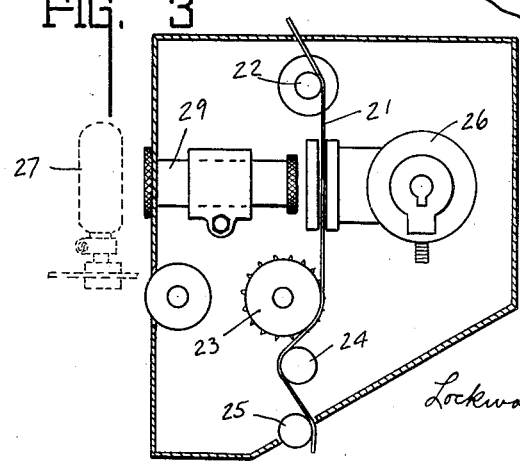
INVENTOR.
WILLIAM H. BAUCH.
BY
Lockwood Lockwood Goldsmith & Galt
ATTORNEYS.

Patented Nov. 21, 1933

1,936,344

UNITED STATES PATENT OFFICE 1,936,344

SOUND PICTURE APPARATUS

William H. Bauch, Shelbyville, Ind., assignor, by mesne assignments, to United Aircraft Products, Inc., Dayton, Ohio, a corporation Application August 18, 1930, Serial No. 475,887
Renewed April 12, 1933

1 Claims. (Cl. 88—16.2)

This invention relates to sound picture apparatus, i. e. apparatus adapted to produce simultaneously a moving picture and synchronized sound.

The principal object of the invention is to provide an apparatus of this class which is assembled in a compact unit requiring a minimum of floor space and which can be installed in a theatre in a fraction of the time required for the installation of types of apparatus heretofore in use.

The principal features of the invention resides in the fact that the picture projecting mechanism and the mechanism for producing varying electric currents from a sound record are systematically grouped upon a single base. The base contains a chamber in which is located the amplifying apparatus necessary to amplify these currents for the production of sound. The apparatus is adapted to use either the sound film or the disc type of sound record.

Figure 1:
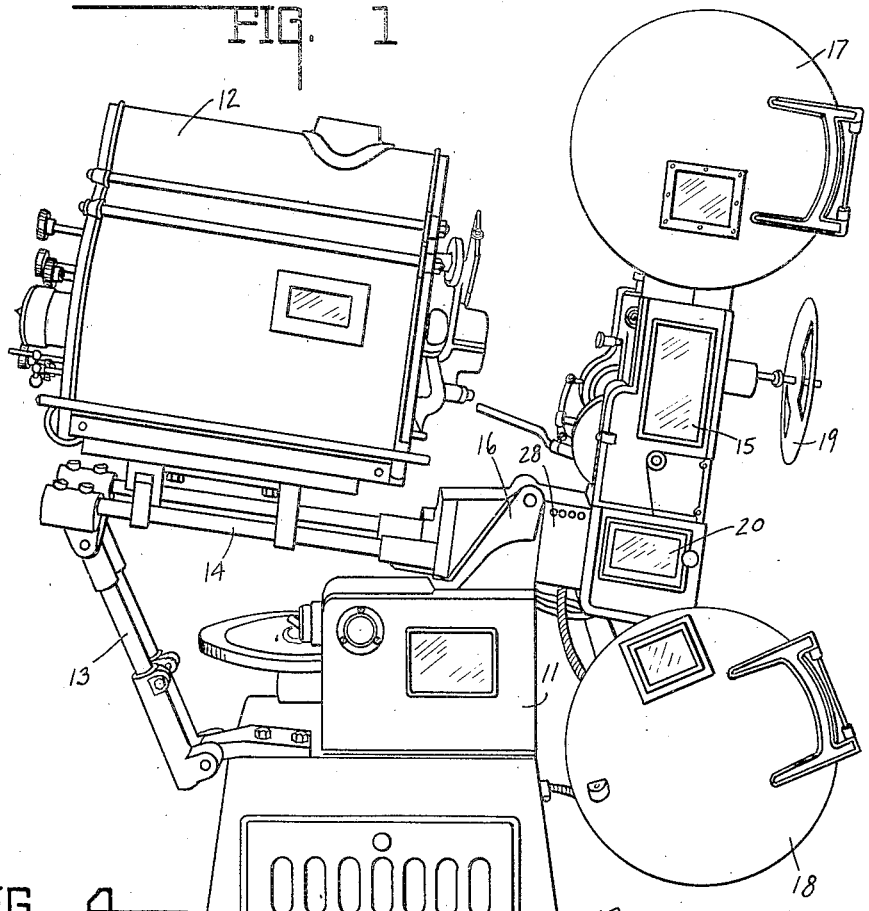
Figure 4:
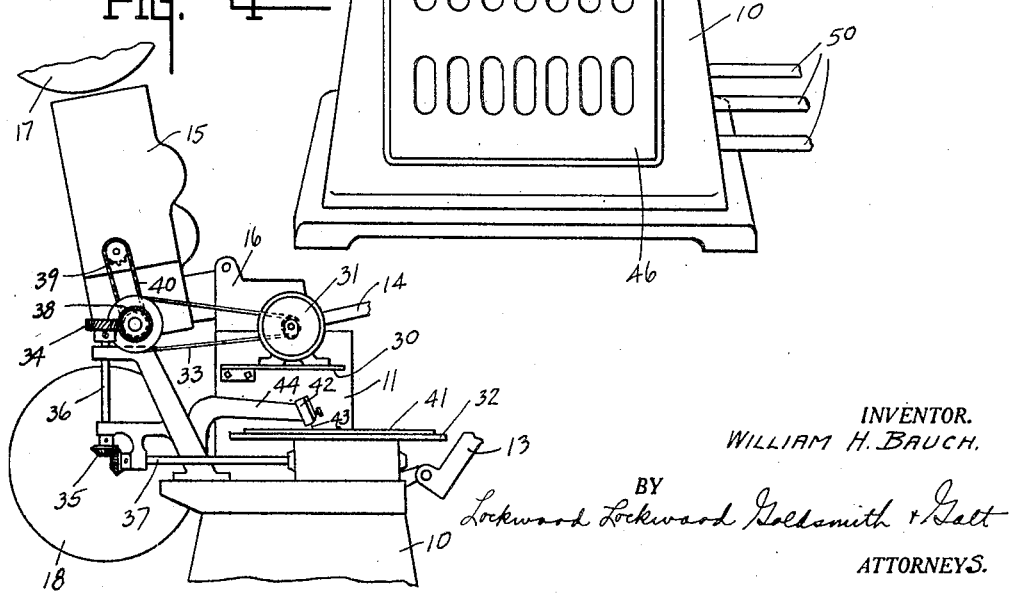

Other objects and features of the invention will be fully understood from the accompanying drawings and the following description and claims:

Fig. 1 is a side elevational view of the complete apparatus. Fig. 2 is an enlarged side elevational view of a portion of the same with the cover removed from the base chamber showing the amplification mechanism therein. Fig. 3 is an enlarged view of a portion of the apparatus shown in Fig. 1 and illustrates the location of the mechanism for producing varying electric currents from a sound track upon the film. Fig. 4 is an elevational view of a portion of the opposite side of the apparatus to that shown in Fig. 1 and illustrates the apparatus for producing varying electrical currents from the disc type of sound record.

A base member 10 supports a small casing 11. A lantern 12 is supported by means of members 13 and 14 partially upon the base 10 and partially upon the casing 11. A housing 15 is supported upon a member 16 in turn carried upon the casing 11. The housing 15 contains the usual film-manipulating mechanism for the production of motion pictures and also supports the film magazines 17 and 18. A shutter 19 of a common form is also carried upon the housing 15. The housing 15 has a lower chamber closed by a door 20 and shown in detail in Fig. 3. A film 21 passes through the said chamber over sprockets 22, 23, 24 and 25. A light-sensitive cell 26 is also contained within the chamber adjacent one side of the film. An exciter lamp 27 is carried in a small casing 28 adjacent the said chamber and is adapted to direct its light rays through a telescope 29 and through the sound track of the film 21 upon the light-sensitive cell 26. Upon one side of the casing 11 there is formed a bracket 30 upon which is supported an electric motor 31. A turn table 32 is carried upon the top of the base 10 at one side of the casing 11. The turn table and the film-manipulating mechanism contained in the housing 15 are simultaneously rotatable by the motor 31 through a belt 33, gears 34 and 35, shafts 36 and 37, sprockets 38 and 39 and chain 40. The turn table 32 is adapted to support a record 41. An electric pickup 42 having a stylus 43 engaging the record is carried upon a suitable tone arm 44.

Within the casing 11 there is positioned a preamplifier, not shown in the drawings. This amplifier consists of a single stage of thermionic amplification and is adapted to receive the varying electric currents produced in the light-sensitive cell 26 and to amplify the same to substantially the same magnitude as that produced by the pickup 42. The base 10 is formed with a chamber 45 therein normally closed by a door 46. Within the chamber 45 there is an upper shelf 47 carrying an amplification unit 48. A second amplification unit 49 is carried beneath the shelf 47 within the chamber 45. The two amplification units 48 and 49 are connected by suitable switches so that either may receive the varying electric currents from either the pickup 42 or the preamplifier within the casing 11. In a normal operation only one of the amplifiers are used, the second being merely a stand by. From the amplifiers 48 and 49 suitable connections lead through conduits 50 to switching apparatus which may be mounted upon the walls of the projection room and thence to suitable sound reproducing apparatus. The amplification units 48 and 49 are relatively heavy parts. When these are placed in the chamber in the base, the weight and size of the base may be greatly reduced without sacrificing the stability of the apparatus as a whole. If the amplifiers were not so placed, it would be necessary to add more weight to the base or to extend its dimensions to provide a stable equilibrium for the apparatus. This is true since the principal upper parts of the apparatus overhang the edges of the base and therefore tend toward an unstable equilibrium.

By means of this invention, an extremely compact picture and sound reproducing apparatus is furnished. The apparatus requires very little floor space compared with that heretofore in use. It has been installed in a theatre in the space of twelve hours as compared to seven to eight days which has heretofore been necessary for other forms of similar apparatus. Since all of the intricate connections between the amplification units and the other apparatus included in the unit are made in the factory and need not be disturbed in the installation of the device in the theatre. This results in an immense saving in theatre hours and, consequently, greatly reduces the actual cost of installation.

The invention claimed is:

In an apparatus for simultaneously producing motion picture and accompanying sounds, the combination of a supporting base having a chamber therein, a lantern carried upon said base, film-manipulating mechanism carried upon said base and associated with said lantern to produce motion pictures, said lantern and film manipulating mechanism overhanging the edge of said base, means for producing a variable electric current from a sound record in timed relation with the manipulation of said film, said means also being carried upon said base, and amplifying mechanism carried in the chamber in said supporting base for amplifying said current for transmission to a sound producing device.

WILLIAM H. BAUCH.